Aug. 12, 1958     D. C. CHARLICK     2,846,714
HANDLE FOR SHOPPING BAGS
Filed May 14, 1956
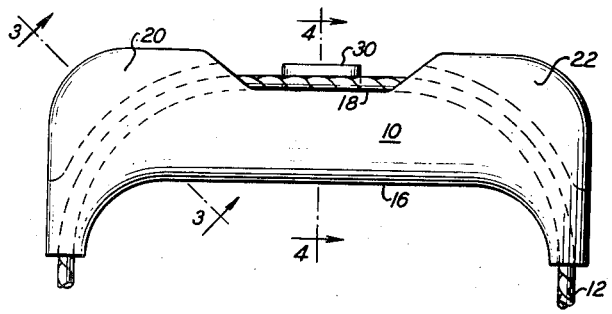
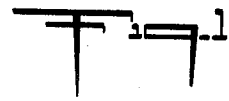
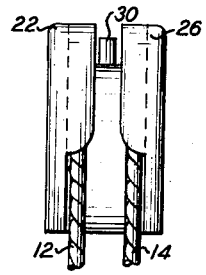
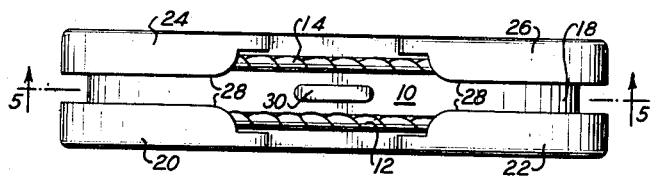
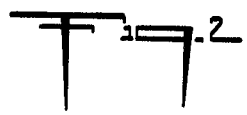
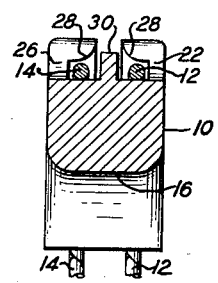
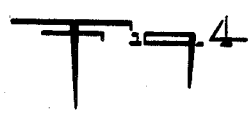
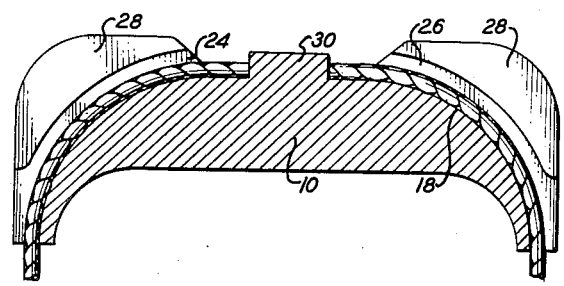
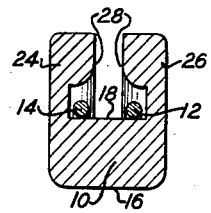
INVENTOR
DOROTHY C. CHARLICK
BY *Fisher & Christen*
ATTORNEYS

United States Patent Office 2,846,714
Patented Aug. 12, 1958

2,846,714

HANDLE FOR SHOPPING BAGS

Dorothy C. Charlick, Washington, D. C.

Application May 14, 1956, Serial No. 584,832

1 Claim. (Cl. 16—114)

This invention relates to a handle for shopping bags and more particularly to a detachable handle for use with shopping bags of the type provided with two cord loop carrying straps.

In shopping bags of this type, the cord straps have a tendency to cut uncomfortably into the hands of the carrier when the bag is loaded with merchanidise. Attempts have been made to eliminate this objectionable feature, but these attempts have been largely unsatisfactory. For example, tubtular handles have been supplied with the carrying cord loops but these are subject to the same disadvantage of being uncomfortable.

Separate handles have been tried but generally have the disadvantage that they fall from the cord straps when the shopping bag is placed momentarily at rest.

It is the object of the present invention to eliminate the disadvantages of the prior handles by providing a handle which is comfortable in the hand of the wearer and which can be conveniently placed on the loop straps of the shopping bag but which is not easily dislodged unintentionally therefrom.

Another object of the invention is to provide a handle for a shopping bag in which each cord loop is removably engaged on four sides thereof by portions of the handle so as to maintain the handle fixed on the strap.

These and other objects of the invention will become more readily apparent from the following detailed description of the invention taken in conjunction with the accompanying drawings in which:

Fig. 1 is a side elevational view of the invention,

Fig. 2 is to top plan view thereof,

Fig. 3 is a cross sectional view taken along lines 3—3 of Fig. 1,

Fig. 4 is a cross sectional view taken along lines 4—4 of Fig. 1,

Fig. 5 is a cross sectional view taken along lines 5—5 of Fig. 2, and

Fig. 6 is an end elevational view thereof.

Referring to the drawings, a handle 10 is shown engaging cord straps 12 and 14. The undersurface 16 of the handle 10 is formed with the suitable transverse curve as shown in Figs. 3 and 4 as well as a longitudinal curve as shown in Fig. 1. This curved surface added greatly to the comfort of the user's hand as it grasps the handle about this curved surface.

The upper surface 18 is the bearing surface which is engaged by the cord straps 12 and 14.

Formed integrally with the lower portion of the handle just described are wall members 20, 22, 24 and 26 which are provided with overhanging flanges 28. It will be observed, from Figs. 3 and 4, that the walls 20 to 26 form with their flanges and the bearing surface 18 an inverted T-shaped slot.

Cooperating with the T-shaped slot is a projection 30 which is disposed centrally of the bearing surface 18 and which serves to maintain the cord straps 12 and 14 laterally of the handle under the flanges 28. Thus when the straps are positioned properly, they are engaged on four sides by portions of the handle, namely, the bearing surface 18, the projection 30, the inner surface of the wall, and the under surface of the overhanging flange 28. In this position the straps will remain in engagement with the handle even though the shopping bag is set down and the handle released by the user. On the other hand, it takes only a slight effort on the part of the user to remove the carrying straps 12 and 14 from the handle. Then the handle can be placed in the pocketbook of the user where it is convenient for use in the next shopping tour.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claim.

What is claimed is:

A handle for a shopping bag having two cord carrying loops comprising, a longitudinal member having a lower surface adapted to be gripped in the hand of the user, an upper surface for receiving said cord loops, said member having wall members extending upwardly above said upper surface only at the four corner portions thereof to confine said cords on said surface, said wall members having end portions along the longitudinal ends of said handle, and having second end portions facing the center of said handle, said second end portions defining a distance along said upper surface, overhanging flanges substantially perpendicular to and integral with each of said wall members, each wall member and overhanging flange forming with said upper surface a groove of a width to receive said cord, and a projection located centrally on said upper surface to separate said cords and maintain each loop outwardly under said flange, said projection being centrally spaced from said second end portions a distance which will allow a human finger to displace said cords from said grooves.

References Cited in the file of this patent

UNITED STATES PATENTS

| | | |
|---|---|---|
| 2,444,558 | Elliott | July 6, 1948 |
| 2,448,894 | Laus | Sep. 7, 1948 |
| 2,684,797 | Schulte | July 27, 1954 |